United States Patent
Pesik et al.

(10) Patent No.: US 10,217,371 B1
(45) Date of Patent: Feb. 26, 2019

(54) METHOD AND SYSTEM FOR AIRCRAFT TAXI STRIKE ALERTING USING ADAPTIVE FIELD OF VIEW

(71) Applicant: Rosemount Aerospace Inc., Burnsville, MN (US)

(72) Inventors: Joseph T. Pesik, Eagan, MN (US); Robert Rutkiewicz, Edina, MN (US); Todd Anthony Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 42 days.

(21) Appl. No.: 15/683,215

(22) Filed: Aug. 22, 2017

(51) Int. Cl.
| | |
|---|---|
| *G06K 9/00* | (2006.01) |
| *G08G 5/04* | (2006.01) |
| *B64D 47/08* | (2006.01) |
| *H04N 5/225* | (2006.01) |
| *G06T 7/73* | (2017.01) |

(Continued)

(52) U.S. Cl.
CPC ............... *G08G 5/04* (2013.01); *B64D 47/08* (2013.01); *G06T 7/521* (2017.01); *G06T 7/74* (2017.01); *H04N 5/2256* (2013.01); *G06T 2207/10028* (2013.01); *G06T 2207/10032* (2013.01); *G06T 2207/10048* (2013.01);

(Continued)

(58) Field of Classification Search
None
See application file for complete search history.

(56) References Cited

U.S. PATENT DOCUMENTS

| | | |
|---|---|---|
| 6,405,975 B1 | 6/2002 | Sankrithi et al. |
| 6,571,166 B1 | 5/2003 | Johnson et al. |

(Continued)

FOREIGN PATENT DOCUMENTS

| | | |
|---|---|---|
| CA | 2464791 A1 | 10/2004 |
| CA | 2737189 A1 | 10/2011 |

(Continued)

OTHER PUBLICATIONS

International Civil Aviation Organization, "Aerodrome Standards: Aerodrome Design and Operations", ICAO: Cooperative Development of Operational Safety and Continuing Airworthiness, dated Jul. 1999, 194 pages.

(Continued)

*Primary Examiner* — Shervin K Nakhjavan
(74) *Attorney, Agent, or Firm* — Kinney & Lange, P.A.

(57) ABSTRACT

Apparatus and associated methods relate to controlling, based on a mode selector, the field of view of an external object detector during aircraft taxi operations. For example, during high-speed taxi operations, the field of view can be controlled to have a relatively-small solid-angle of detection capability. The relatively-small solid-angle field of view can be aligned so as to detect more distant objects within a narrow corridor extending forward of the aircraft's wingtips. During low-speed taxi operations, for example, the field of view can be controlled to have a relatively-large solid-angle of detection capability. The relatively-large solid-angle field of view can be aligned so as to detect close objects in the vicinity of the aircraft wings and engine nacelle. The object detector projects structured light within the controlled field of view, thereby illuminating the object(s) external to the aircraft that are within the illumination field of view.

20 Claims, 7 Drawing Sheets

(51) Int. Cl.
*G06T 7/521* (2017.01)
*G08B 3/10* (2006.01)

(52) U.S. Cl.
CPC .............. *G06T 2207/10152* (2013.01); *G06T 2207/30241* (2013.01); *G06T 2207/30261* (2013.01); *G08B 3/10* (2013.01)

(56) References Cited

U.S. PATENT DOCUMENTS

| | | | |
|---|---|---|---|
| 6,754,370 B1* | 6/2004 | Hall-Holt | G01B 11/25 356/3 |
| 6,909,381 B2* | 6/2005 | Kahn | G08G 5/0021 340/945 |
| 6,937,348 B2* | 8/2005 | Geng | G01B 11/2509 356/602 |
| 7,592,929 B2 | 9/2009 | Pepitone | |
| 7,974,773 B1 | 7/2011 | Krenz et al. | |
| 8,692,980 B2* | 4/2014 | Gilliland | G01S 7/4813 356/5.01 |
| 9,047,771 B1 | 6/2015 | Thoreen et al. | |
| 9,174,746 B1 | 11/2015 | Bell et al. | |
| 9,245,450 B1 | 1/2016 | Chiew et al. | |
| 9,401,094 B2 | 7/2016 | Cros et al. | |
| 10,096,256 B2* | 10/2018 | Rutkiewicz | G08G 5/04 |
| 2007/0241936 A1 | 10/2007 | Arthur et al. | |
| 2008/0062011 A1* | 3/2008 | Butler | G01S 3/783 340/961 |
| 2008/0294315 A1* | 11/2008 | Breed | B60N 2/002 701/49 |
| 2009/0140887 A1* | 6/2009 | Breed | G01C 21/165 340/990 |
| 2009/0262760 A1* | 10/2009 | Krupkin | G01S 7/414 372/6 |
| 2010/0094487 A1 | 4/2010 | Brinkman | |
| 2014/0092206 A1 | 4/2014 | Boucourt et al. | |
| 2014/0142838 A1* | 5/2014 | Durand | G08G 5/04 701/301 |
| 2015/0142214 A1 | 5/2015 | Cox et al. | |
| 2016/0090196 A1 | 3/2016 | Besettes et al. | |
| 2017/0067734 A1* | 3/2017 | Heidemann | G01B 11/2513 |
| 2017/0301250 A1* | 10/2017 | Ell | B64D 43/00 |
| 2017/0334578 A1 | 11/2017 | Fleck et al. | |
| 2018/0253983 A1* | 9/2018 | Ell | G08G 5/04 |
| 2018/0261111 A1* | 9/2018 | Rutkiewicz | G08G 5/04 |
| 2018/0301043 A1* | 10/2018 | Rutkiewicz | G08G 5/04 |

FOREIGN PATENT DOCUMENTS

| | | |
|---|---|---|
| CN | 105391975 A | 3/2016 |
| EP | 0980828 A1 | 2/2000 |
| EP | 1842772 A2 | 10/2007 |
| EP | 1927965 A2 | 6/2008 |
| EP | 2426461 A2 | 3/2012 |
| EP | 2495168 A1 | 9/2012 |
| EP | 2565861 A2 | 3/2013 |
| EP | 2685442 A2 | 1/2014 |
| WO | 2009010969 A2 | 1/2009 |
| WO | 2017055549 A1 | 4/2017 |

OTHER PUBLICATIONS

International Civil Aviation Organization, "Airport Markings: ICAO & U.S. Requirements", ICAO: Federal Aviation Administration, dated Jun. 2012, 19 pages.
U.S. Department of Transporation, "Advisory Circular", U.S. DOT: Federal Aviation Administration, dated Sep. 27, 2013, 144 pages.
Xu, Lun Hui et al., "A New Lane Department Warning Algorithm Considering the Driver's Behavior Characteristics", Hindawi Publishing Corporation: Mathematical Problems in Engineering, dated Jul. 26, 2015, 12 pages.
Federal Aviation Administration, "A Quick Reference to Airfield Standards", FAA: Southern Region Airports Division, dated Jan. 2018, 69 pages.

\* cited by examiner

METHOD AND SYSTEM FOR AIRCRAFT TAXI STRIKE ALERTING USING ADAPTIVE FIELD OF VIEW

BACKGROUND

Each year, significant time and money are lost due to commercial aircraft accidents and incidents during ground operations, of which significant portions occur during taxiing maneuvers. During ground operations, aircraft share the taxiways with other aircraft, fuel vehicles, baggage carrying trains, mobile stairways and many other objects. Aircrafts often taxi to and/or from fixed buildings and other fixed objects. Should an aircraft collide with any of these objects, the aircraft must be repaired and recertified as capable of operation. The cost of repair and recertification, as well as the lost opportunity costs associated with the aircraft being unavailable for use can be very expensive.

Pilots are located in a central cockpit where they are well positioned to observe objects that are directly in front of the cabin of the aircraft. Objects that are not located directly in front of the cabin, however, can be more difficult to observe. Wings are attached to the cabin behind the cockpit and extend laterally from the cabin in both directions. Some commercial and some military aircraft have large wingspans, and so the wings on these aircraft laterally extend a great distance from the cabin and are thus positioned behind and out of the field of view of the cockpit. Some commercial and some military planes have engines that hang below the wings of the aircraft. Pilots, positioned in the cabin, can have difficulty knowing the risk of collisions between objects external to the aircraft and the wingtips and/or engines.

There are various types of on-ground operations that an aircraft must perform at an airport, each of which presenting different collision risks to the aircraft. The taxi-in and taxi-out phases require that the aircraft move between the runway and the terminal gates, for example. During taxi-in, the aircraft must first transition from the runway to a taxiway and then to the gateway. Sometimes, the taxiway can include an elaborate network of roads requiring the aircraft to travel over straight stretches as well as turns and transitions to/from the taxiway. Some high-speed taxi operation occurs on one-way taxiways dedicated to aircraft only. During such high-speed taxi operation, relatively distant objects located in the forward direction of the aircraft might present the greatest risk of collision to the aircraft. During low-speed taxiing and gateway approach, nearby objects in the vicinity of the wings and engine nacelles might present the greatest risk of collision to the aircraft. Thus, an adaptive field of view for an aircraft on-ground collision alerting system would be useful to facilitate surveillance of areas most likely to have objects external to the aircraft, which could present a risk of collision with the aircraft.

SUMMARY

Apparatus and associated methods relate to a system for calculating position values and/or range data of an object(s) external to an aircraft. The system includes a mode selector configured to determine an illumination field of view. The system includes a projector mounted at a projector location on the aircraft and configured to project structured light within the illumination field of view, thereby illuminating the object(s) external to the aircraft that are within the illumination field of view. The system includes a camera mounted at a camera location on the aircraft and configured to receive a portion of the structured light reflected by the object(s) within the illumination field of view. The camera is further configured to focus the received portion onto a focal plane array comprising a plurality of light-sensitive pixels, thereby forming an image of object(s) within the illumination field of view. The image includes pixel data generated by the plurality of light-sensitive pixels. The system also includes an image processor configured to identify pixel coordinates corresponding to a subset of the plurality of light-sensitive pixels upon which the received portion of the structured light reflected by the object(s) within the illumination field of view is focused. The image processor is further configured to use triangulation, based on the projector location, the camera location, and the identified pixel coordinates, to calculate the position values and/or range data of the object(s) within the illumination field.

Some embodiments relate to a method for generating an alert signal of a potential aircraft collision for a taxiing aircraft. The method includes the step of determining an illumination field of view. Then, structured light is projected within the determined illumination field of view. A portion of the structured light reflected by object(s) within the illumination field of view is received. The received portion is focused onto a focal plane array having a plurality of light-sensitive pixels, thereby forming an image of object(s) within the illumination field of view. The image includes pixel data generated by the plurality of light-sensitive pixels. Then, the method identifies pixel coordinates corresponding to a subset of the plurality of light-sensitive pixels upon which the received portion of the structured light reflected by the object(s) within the illumination field of view is focused. The method then calculates, based on the projector location, the camera location, and the identified pixel coordinates, position values and/or range data of the object(s) within the illumination field of view by which the structured light is reflected. An alert signal is generated if the calculated position values and range data of the object(s) indicate that one or more of the object(s) are within a collision zone or on a collision trajectory.

DETAILED DESCRIPTION

Figures 1A, 1B:
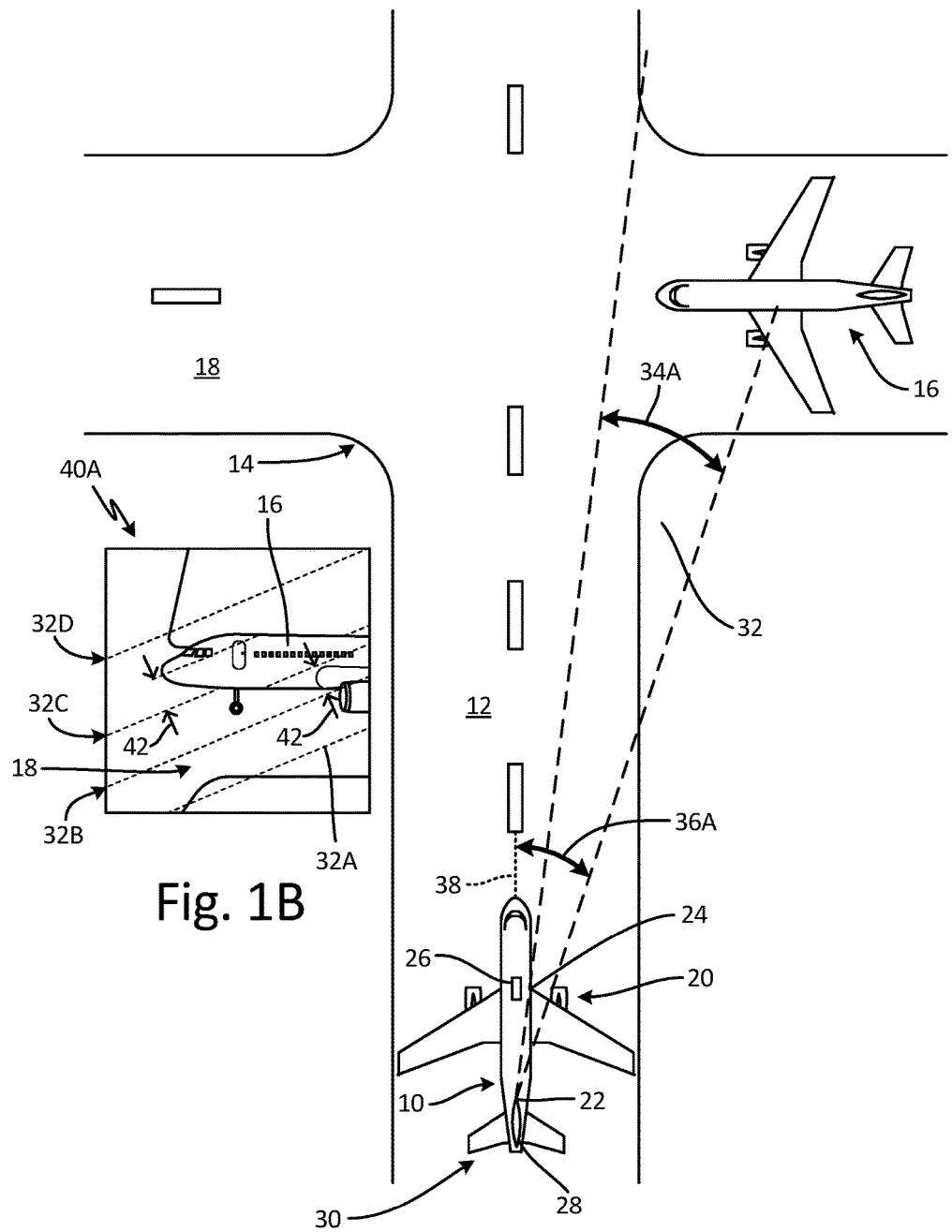
FIG. 1A is a schematic view of an exemplary aircraft collision alerting system used by an aircraft on a taxiway.
FIG. 1B depicts an image captured by a camera of the collision alerting system mounted to the aircraft depicted in FIG. 1A.

Apparatus and associated methods relate to controlling, based on a mode selector, the field of view of an external object detector during aircraft taxi operations. For example, during high-speed taxi operations, the field of view can be controlled to have a relatively-small solid-angle of detection capability. The relatively-small solid-angle field of view can be aligned so as to detect more distant objects within a narrow corridor extending forward of the aircraft's wingtips. During low-speed taxi operations, for example, the field of view can be controlled to have a relatively-large solid-angle of detection capability. The relatively-large solid-angle field of view can be aligned so as to detect close objects in the vicinity of the aircraft wings and engine nacelle. The object detector projects structured light within the controlled field of view, thereby illuminating the object(s) external to the aircraft that are within the illumination field of view.

Determining locations and/or ranges of objects nearby an aircraft can be performed using triangulation of structured light projected upon and reflected by the objects. Only objects upon which the projected structured light falls can reflect that projected structured light. The structured light is projected by a projector that has a controlled field of view of projection. The field of view can be controlled based on a mode of ground operation of the aircraft. Triangulation can be used to calculate locations and/or ranges of objects from which the structured light is reflected. The locations and/or ranges can be calculated based on a location of a structured projector, a location of a camera or imager, and the pixel coordinate upon which the reflected structured light is focused.

The structured light can be a pulse of light projected in a pattern, such as, for example, a pulse having a fixed azimuthal angle of projection but having an elevational angle of projection between +/−5 degrees from the horizontal. In some embodiments, the structured light can be a collimated beam rastered or scanned in a pattern. Various other types of patterned light can be projected. The structured light is projected within a controlled field of view. This means that outside of the controlled field of view, substantially no light energy is projected. Herein the term structured light indicates that light is projected within the solid-angle of the field of view in such a manner that the projected light is not uniformly projected throughout the solid-angle of projection. For example, light will be primarily projected along certain azimuthal and/or elevational angles comprising a subset of the azimuthal and elevational angles within the solid-angle of light projection. Other subsets of the solid-angle of light projection can be used for structured light projection.

In some embodiments, the structured light can have a wavelength corresponding to infrared light and/or to an atmospheric absorption band. Using infrared light, because it is outside the visible spectrum, can minimize a distraction to a pilot who is taxiing the aircraft. Using infrared light that has a wavelength within an atmospheric absorption band can permit low-power projector illumination, as the illuminating power need not compete with the sun's illumination in such an absorption band. Knowing a first aircraft location from where the light is projected, a second aircraft location where the reflection is imaged, and a pixel coordinate within the image corresponding to an object from which the spatially patterned is reflected light permits a calculation of the location and/or range of that reflecting object.

FIG. 1A is a schematic view of an exemplary aircraft collision alerting system used by an aircraft on a taxiway. In FIG. 1A, first aircraft 10 is taxiing along one-way taxiway 12 at a relatively high speed. First aircraft 10 is approaching taxiway crossing 14. Second aircraft 16 is near the taxiway crossing 14 on taxiway 18. First aircraft 10 is equipped with aircraft collision alerting system 20. Aircraft collision alerting system 20 includes projector 22, camera 24, and a controller 26. In the depicted embodiment, projector 22 is mounted on vertical stabilizer 28 of tail 30. Projector 22 is configured to project structured light 32 onto a scene external to first aircraft 10, thereby illuminating objects external to first aircraft 10. Projector 22 can be mounted at other locations on first aircraft 10 in other embodiments. Controller 26 controls the solid-angle of projection, such that projector 22 projects structured light 32 within the controlled solid-angle of projection. In the depicted embodiment, the solid-angle of projection includes azimuthal angle of projection 34A.

The solid-angle of projection represents a small fraction of the full two pi steradians of a half sphere of projection. The relatively-small solid-angle of projection is configured to project structured light 32 onto objects, such as second aircraft 16, located within small azimuthal angle 36A of longitudinal axis 38 of first aircraft 10. By controlling the solid-angle of projection, the power required for projecting structured light 32 can be controlled. In some embodiments, in addition to controlling the solid-angle of projection, controller 26 also can control the optical focus and/or dispersion of projected structured light 32, and the emission power of structured light 32. For example, when controller 26 controls a small solid-angle, such as the one depicted in FIG. 1A, controller 26 might also increase the emission power and collimate the structured light pattern so as to reduce dispersion. One or more of such controlled parameters of structured light 32 can facilitate detection of objects that are relatively distant from first aircraft 10.

FIG. 1B depicts an image captured by a camera of the collision alerting system mounted to the aircraft depicted in FIG. 1A. In FIG. 1B, captured image 40A has a field of view commensurate with the solid-angle of projection of structured light 32. In other embodiments, captured image 40A can have a field of view different than the field of view used for structured-light projection. Captured image 40A depicts second aircraft 16 on taxiway 18. Superimposed on taxiway 18 and second aircraft 16 are lines 32A-32D of structured light 32. Because projector 22 and camera 24 are mounted to first aircraft 10 at different locations, lines 32A-32D will have discontinuities 42 in captured image 40A where structured light 32 encounters objects, such as second aircraft 16. Such discontinuities 42 in captured image 40A are indicative of differences in the locations and/or ranges of the objects from which structured light 32 reflects.

Figure 2B:
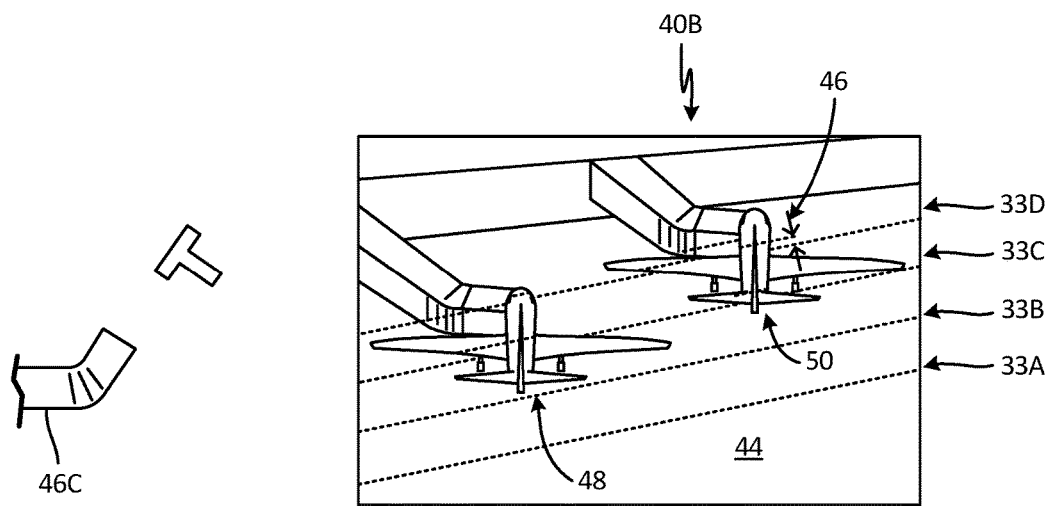
FIG. 2B depicts an image captured by a camera of the collision alerting system mounted to the aircraft depicted in FIG. 2A.
Figure 2A:
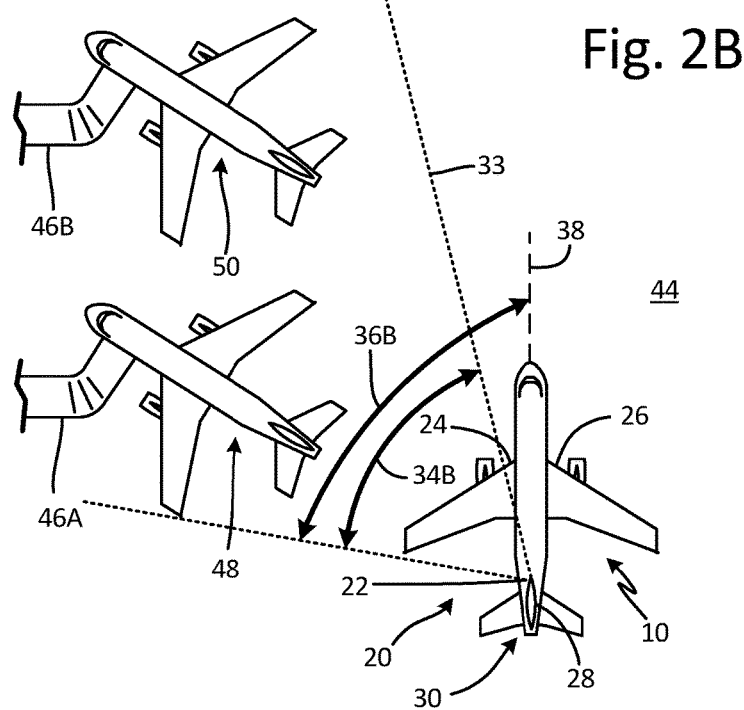
FIG. 2A is a schematic view of an exemplary aircraft collision alerting system used by an aircraft approaching a gateway.

FIG. 2A is a schematic view of an exemplary aircraft collision alerting system used by an aircraft approaching a gateway. In FIG. 2A, first aircraft 10 is taxiing on tarmac 44 at a relatively low speed. First aircraft 10 is approaching gate 46C. Aircraft 48 and 50 are parked at gates 46A and 46B, respectively. First aircraft 10 is again equipped with aircraft collision alerting system 20. Aircraft collision alerting system 20 includes projector 22, camera 24, and a controller 26. In the depicted embodiment, projector 22 is mounted on vertical stabilizer 28 of tail 30. Projector 22 is configured to project structured light 33 onto a scene external to first aircraft 10, thereby illuminating objects external to first aircraft 10. Controller 26 controls the solid-angle of projection, such that projector 22 projects structured light 33 within the controlled solid-angle of projection. In the depicted embodiment, the solid-angle of projection includes azimuthal angle of projection 34B.

The solid-angle of projection shown in FIG. 2A represents a wider field of view than the field of view of the solid-angle of projection depicted in FIG. 1A. This relation is represented by the azimuthal angle of projection 34B being greater than the azimuthal angle of projection 34A. The relatively-large solid-angle of projection is configured to project structured light 33 onto objects, such as aircraft 48 and 50, located within large azimuthal angle 36B as measured from longitudinal axis 38 of first aircraft 10. By controlling the solid-angle of projection, the power required for projecting structured light 33 can be controlled. In some embodiments, in addition to controlling the solid-angle of projection, controller 26 also can control the optical focus and/or dispersion of projected structured light 33, and the emission power of structured light 33. For example, when controller 26 controls a large solid-angle, such as the one depicted in FIG. 2A, controller 26 might also decrease the emission power and collimate the structured light pattern so as to permit increased dispersion. One or more of such controlled parameters of the structured light 33 can facilitate detection of objects that are relatively nearby first aircraft 10.

FIG. 2B depicts an image captured by a camera of the collision alerting system mounted to the aircraft depicted in FIG. 2A. In FIG. 2B, captured image 40B has a field of view commensurate with the solid-angle of projection of structured light 33. In other embodiments, captured image 40B can have a field of view different than the field of view used for structured-light projection. Captured image 40B depicts aircraft 48 and 50 parked at gates 46A and 46B, respectively. Superimposed on tarmac 44 and aircraft 48 and 50 are lines 33A-33D of structured light 33. Because projector 22 and camera 24 are mounted to first aircraft 10 at different locations, lines 33A-33D will have discontinuities 42 in captured image 40B where structured light 33 encounters objects, such as second aircraft 16. Such discontinuities 42 in captured image 40B are indicative of differences in the locations and/or ranges of the objects from which structured light 33 reflects.

Collision alerting system 20 can determine locations and/or ranges of objects using triangulation. Projector 22 projects structured light 32 (FIG. 1A) or 33 (FIG. 2A) within a controlled field of view having a predetermined solid-angle of illumination. Structured light 32 or 33 illuminates various objects that reside within the predetermined solid-angle of illumination. In the depicted embodiment, projector 22 has an optical axis that is coplanar with longitudinal axis 38 of first aircraft 10. Controller 26 is configured to control the field of view within which projector 22 projects structured light 32. Projector 22 is shown illuminating objects that are within various azimuthal angle ranges, for example, and within an elevation range of a projection horizon of projector 22, in FIGS. 1A-2B. The elevation range of projection, for example, can be from about +3, +5, +10, +12, or +15 degrees to about −2, −5, −8, or −10 degrees of projection from a vertical location of projector 22.

In some embodiments, structured light 32 or 33 can continuously illuminate objects within the solid-angle of illumination. In other embodiments, structured light 32 or 33 can intermittently illuminate objects within the solid-angle of illumination. Such illumination may use light of various wavelengths. For example, in some embodiments, infrared light, being invisible to a human eye, can be used to provide illumination of objects within the solid-angle of illumination. Infrared light can advantageously be non-distractive to pilots and to other people upon whom the collimated beam of light is projected.

In some embodiments, the directed beam of light is pulsed on for a limited time, with image capture synchronized with the projector illumination. Shorter image capture durations reduce the light captured from solar illumination, lowering the needed projector power. In some embodiments, projector 22 is controlled so as to facilitate imaging of various objects within the scene by a left-side camera and/or a right-side camera. Projector 22 can be controlled, based on a mode of ground operation of first aircraft 10, for example. Various parameters of structured light 33 produced by projector 22 can be controlled. For example, the azimuthal range of a field of view can be controlled. In some embodiments, focus/beam divergence and/or emission power can be controlled. In some embodiments, the field of view can be controlled, based upon an input device, such as a switch or keypad. In other embodiments, the field of view can be controlled in response to aircraft operating conditions, such as ground speed, steering wheel orientation, etc.

In some embodiments, intensity of the directed beam of light can be controlled based on ground speed of aircraft. Faster moving aircraft may control the directed beam of light to have a greater intensity. Also, the intensity can be controlled such that objects at greater ranges are illuminated at a greater intensity than objects at a closer range. In some embodiments, the intensity of the directed beam of light may be controlled based on atmospheric conditions (e.g., atmospheric attenuation). In an exemplary embodiment, power intensity of the directed beam can be varied while looking at a known location(s) on first aircraft 10. A magnitude of the signal reflected from the known location(s) on first aircraft 10 can be compared to a predetermined reference signal level at a standard attenuation to determine instantaneous attenuation of atmospheric conditions. Such a method can be used to normalize the measured reflected power intensity for various atmospheric conditions.

In some embodiments, light having wavelengths within an atmospheric absorption band can be used. Careful selection of projector wavelength can permit projector 22 to compete favorably with solar energy. There are, however, certain wavelengths where the atmospheric absorption is so great that both projector energy and solar energy are attenuated equally. Light is broadband as emitted from the sun with a maximum intensity falling in the visible light spectrum. Sunlight having wavelengths within the infrared spectrum is of lower intensity than the visible band. And so, projected light having such wavelengths need not compete with the sunlight. Using light having such wavelengths can thereby permit reduced power levels in projecting structured light. Atmospheric absorption bands may further reduce solar infrared illumination. For example, atmospheric absorption bands include infrared wavelengths of between about 1.35-1.4, 1.8-1.95, 2.5-2.9, and 5.5-7.2 microns.

The structured light that is projected by projector 22 can be formed by a collimated beam scanned in a predetermined pattern so as to have a structure that can be identified in images formed by camera 24. Using knowledge of the location from which the feature is projected (e.g., the location of image projector 22), the location of the camera 24 and the location within the images (e.g., pixel coordinates) where the feature is imaged, can permit location determination using triangulation of the object reflecting the structured light. For example, projector 22 can be located at an elevation on first aircraft 10 that is higher than an elevation where camera 24 is located. A location of the imaged feature can be used to determine a location and a range distance to the object from which that specific feature is reflected.

Projector 22, for example, can emit structured light to produce a pattern that, when reflected from a surface having a normal direction to longitudinal axis 38, is imaged as horizontal lines by camera 24. One structured light beam, for example, might be projected at an angle of elevation of zero degrees (i.e., directed parallel to the horizon). A second structured light beam might be projected at an angle of negative five degrees from the horizon (i.e., directed at a slightly downward angle from projector 22). Each of these projected structured light beams, when reflected from an object, will be imaged at a different vertical location (e.g., each will have a different vertical pixel coordinate) within the camera image, depending on the range distance between the reflecting object and first aircraft 10. Knowing the elevation of projector 22, the elevation of camera 24, the specific feature of the structured light (e.g., which horizontal line is imaged), and the location within the camera image where the specific feature is imaged can permit a determination of the location of the object from which the specific feature has been reflected.

Using the calculated location information, pilots of first aircraft 10 can be informed of any potential collision hazards within the scene illuminated by projector 22. Pilots of first aircraft 10 can steer first aircraft 10 to avoid wingtip collisions and/or engine collisions based on the location and range information that is calculated by aircraft collision alerting system 20.

Figure 3:
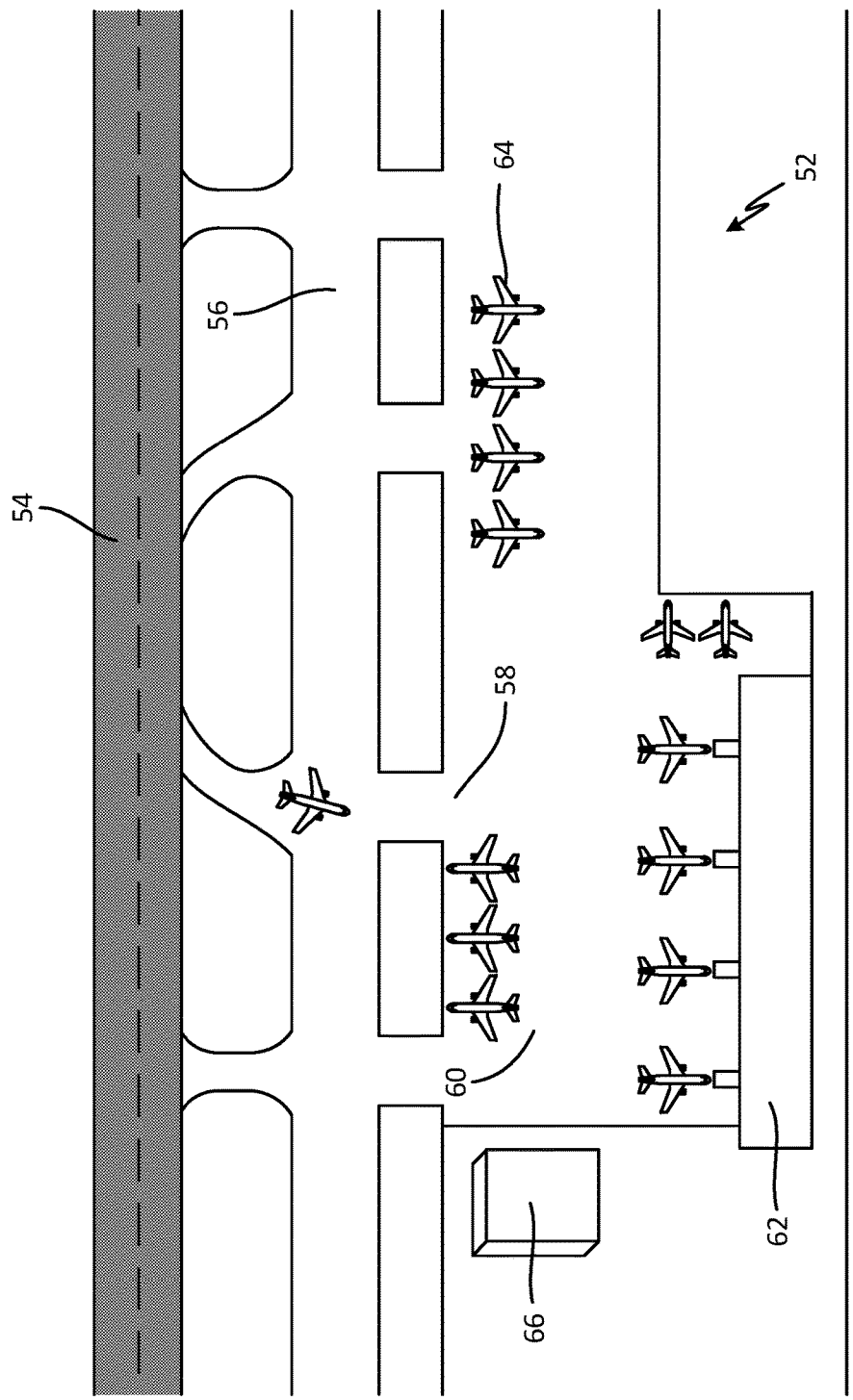
FIG. 3 is a plan view of an airport showing various regions in which various types of on-ground operations are performed.

FIG. 3 is a plan view of an airport showing various regions in which various types of on-ground operations are performed. In FIG. 3, airport 52 includes runway 54, taxiways 56, apron 58, ramp 60, terminal gates 62, aircraft stands 64, and hangar 66. Various ground operations are performed when an aircraft is navigating around and/or over each of these different areas of airport 52. For example, when an aircraft is being pushed back from terminal gates 62, the aircraft might be turned so as to exit ramp 60. And when the aircraft then navigates ramp 60, it must carefully avoid the objects there located, including parked aircraft and support vehicles, for example. Then when the aircraft navigates taxiways 56, it might taxi at a higher speed than when navigating ramp 60. Each of these different areas presents different risks of collision between the aircraft and objects external to the aircraft. Because different risks are present at different areas within airport 52, different fields of view can be used to detect the objects that present the collision risks.

Figure 4:
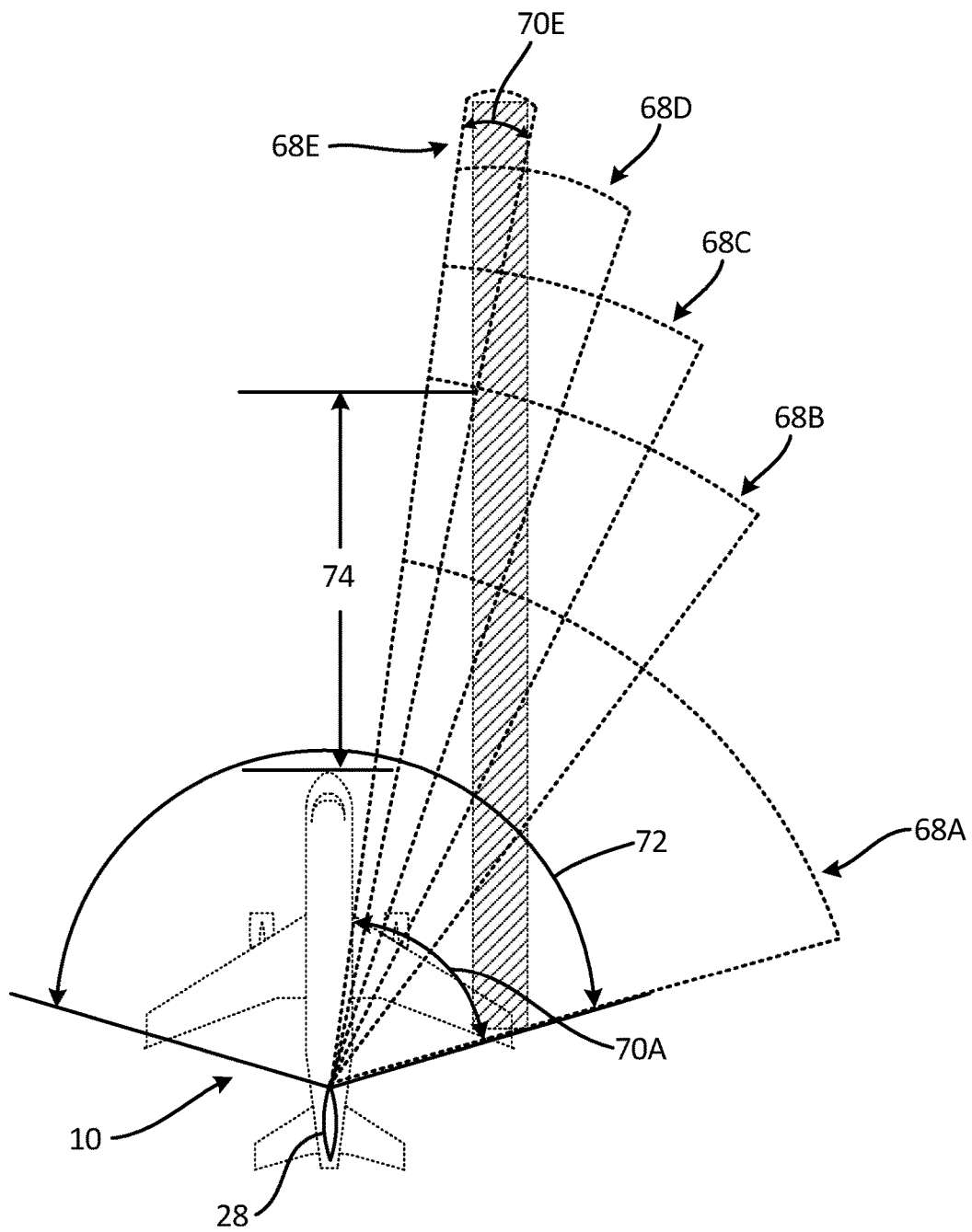
FIG. 4 is a schematic view depicting various fields of view of an aircraft collision alerting system used by an aircraft during on-ground operations.

FIG. 4 is a schematic view depicting various fields of view of an aircraft collision alerting system used by an aircraft during on-ground operations. In FIG. 4, aircraft 10 includes projector 22 mounted on vertical stabilizer 28. Projector 22 is configured to project structured light within various controlled fields of view 68A-68E. Fields of view 68A-68E are progressively smaller. Field of view 68A has a relatively large azimuthal angle 70A compared with relatively small azimuthal angle 70E corresponding to field of view 68E. Each of fields of view 68A-68E are configured such that to detect objects within narrow corridor 72 extending forward of the aircraft's wingtips. Structured light projected within field of view 68E will illuminate objects that are located within narrow corridor 72, but only if such objects are located at a distance greater than minimum distance 74 of aircraft 10. Whereas, structured light projected within field of view 68A will illuminate objects that are located within narrow corridor 72 at any distance depicted in FIG. 4. Furthermore, structured light projected within field of view 68A will illuminate objects on the right-hand side of aircraft 10, so as to facilitate objects that present a collision risk should aircraft 10 turn in the right-hand direction. Thus, relatively-wide field of view 68A provides object detection in scenarios in which aircraft 10 might be turning, whereas relatively-narrow field of view 68E provides objet detection in scenarios in which aircraft 10 might be taxiing in a straight direction and not turning.

Figure 5:
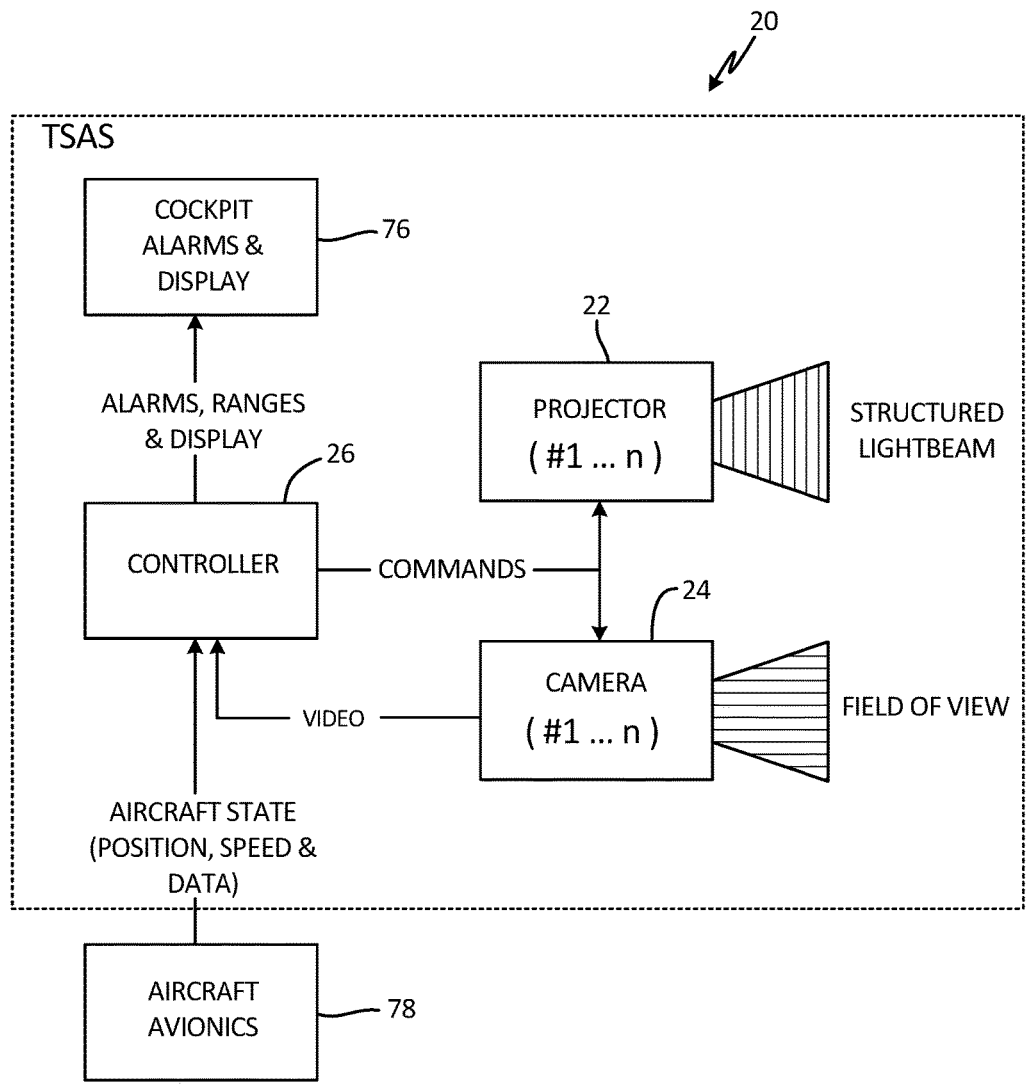
FIG. 5 is a detailed block diagram of the exemplary aircraft collision alerting system depicted in FIG. 2.

FIG. 5 is a block diagram of an exemplary aircraft collision alerting system. Aircraft collision alerting system 20 includes projector(s) 22, camera(s) 24, controller 26, and cockpit alarm and display module 76. Projector(s) 22 is configured to be mounted at a projector location on an aircraft. Projector(s) 22 is further configured to project structure light from projector(s) 22 onto a scene external to the aircraft, thereby illuminating a spatially-patterned portion of the scene.

Camera(s) 24 is configured to be mounted at one or more camera locations on the aircraft. Camera(s) 24 is further configured to receive light reflected from the scene. Camera(s) 24 is further configured to focus the received light onto a focal plane array comprising a plurality of light-sensitive pixels, thereby forming an image of the scene. The image can include pixel data generated by the plurality of light-sensitive pixels.

Controller 26 receives inputs from camera(s) 24 and from aircraft avionics 78. Controller 26 generates commands that control the operation of projector(s) 22 and camera(s) 24. Controller 26 outputs signals indicative of alarms, ranges, and/or images to cockpit alarms and display module 76. Controller 26 is configured to identify pixel coordinates corresponding to a subset of the plurality of light-sensitive pixels upon which the spatially-patterned light projected by projector(s) 22 and reflected from the spatially-patterned portion of the scene is focused. Controller 26 is further configured to use triangulation, based on the projector location of projector(s) 22, the location(s) of camera(s) 24 and the identified pixel coordinates, to calculate range value data of object(s) in the scene from which the spatially-patterned light projected by projector(s) 22 is reflected.

Figure 6:
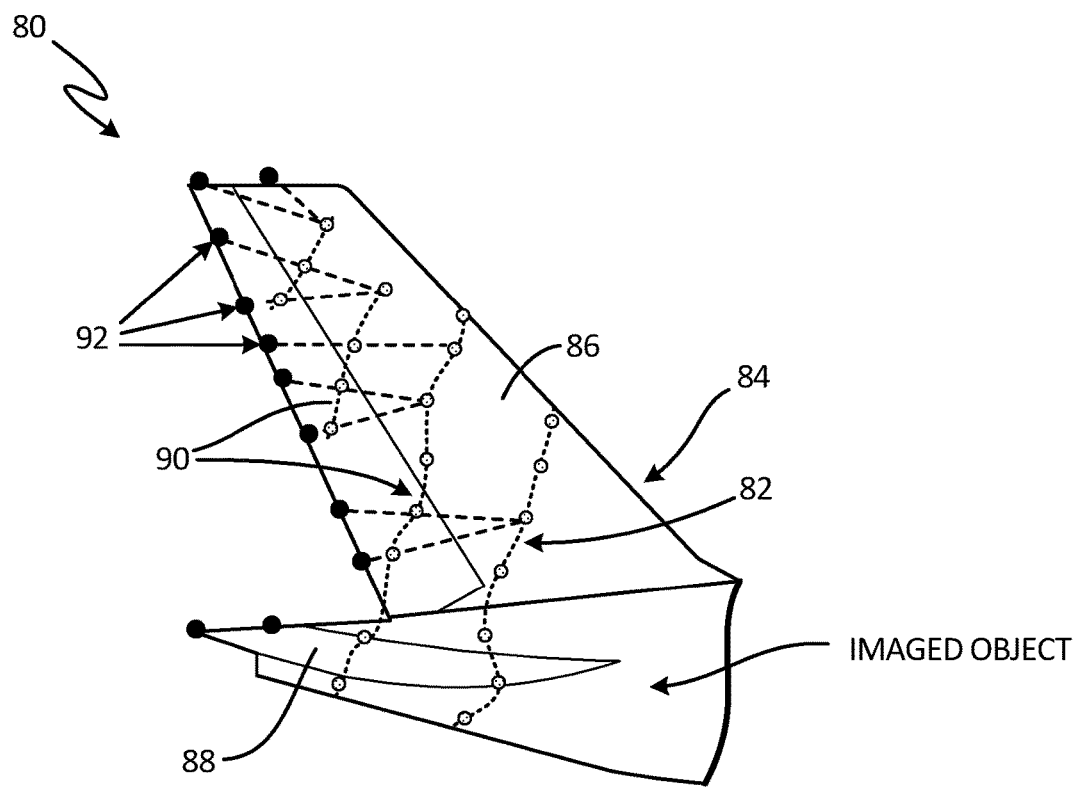
FIG. 6 is a schematic diagram depicting object location determination using both active and passive imaging.

FIG. 6 is a schematic diagram depicting object location determination using both active and passive imaging. In FIG. 6, camera image 80 of tail 82 of aircraft 84 external to first aircraft 10 (depicted in FIG. 2A) is shown. Camera image 80 is composed from intensity data of a two-dimensional array of light-sensitive pixels (not individually depicted). Tail 82 includes vertical stabilizer 86 and horizontal stabilizer 88. Vertical stabilizer 86 depicts features 90 of structured light projected thereon. Features 90 are diagonal lines of light. Features 90 are imaged by a subset of the two-dimensional array of light-sensitive pixels composing the image. For each of the subset of the two-dimensional array of light-sensitive pixels containing the structured light projected upon tail 82, a range value is calculated.

Between the subset of pixels that have calculated range values, are pixels upon which the collimated beam of light has not been projected. For some, if not all, of these pixels, range values can be calculated using the already calculated range values corresponding to nearby pixels. For example, range values can be calculated for the pixels determined to be boundary pixels of an object. Range values for boundary pixels 92 may be calculated by modeling the range variations within a single object as a polynomial function of spatial coordinates, for example. Such a model may be used to calculate range values using the pixel coordinates and corresponding range values of pixels having already calculated range values that reside within the object boundary associated with boundary pixels 92.

Various embodiments can use various structured light patterns having various features. For example, in some embodiments, vertical or diagonal lines can be projected upon a scene. In some embodiments, spots of light can be projected upon a scene. In an exemplary embodiment, both vertical lines and horizontal lines can be projected upon a scene, using projectors that are horizontally and/or vertically displaced, respectively, from the camera location.

Figure 7:
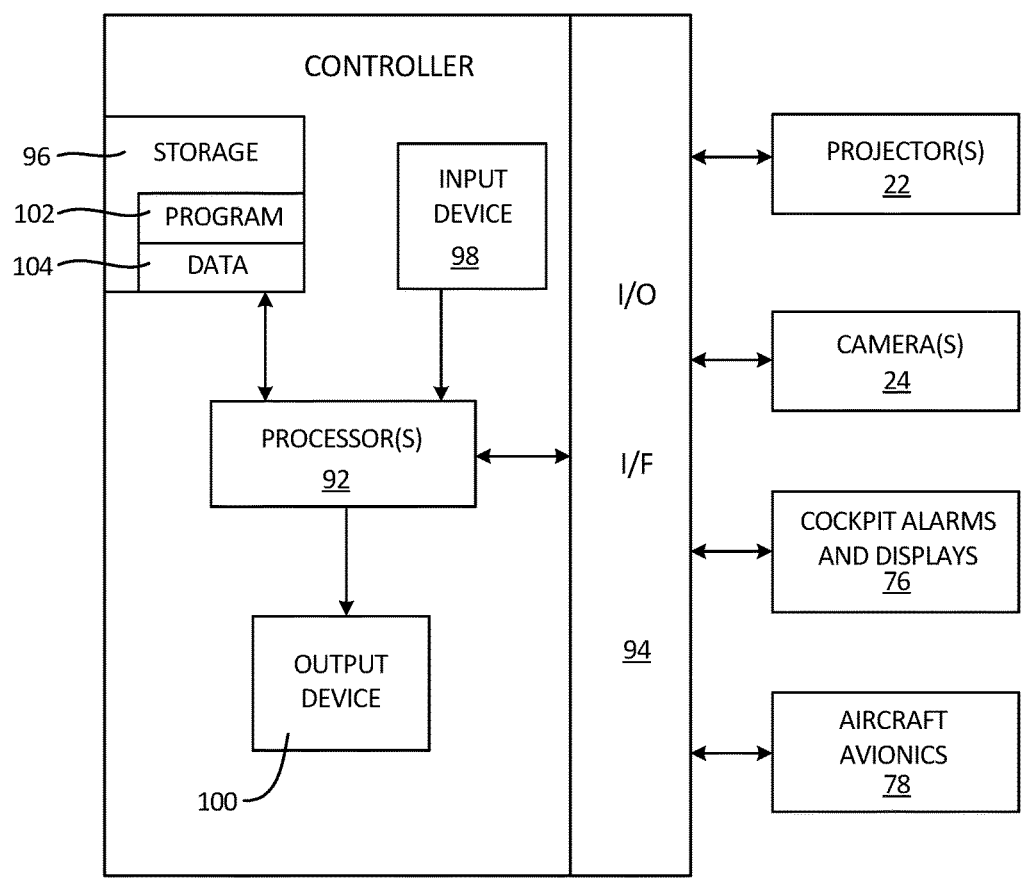
FIG. 7 is block diagram of an embodiment of controller 26 depicted in FIG. 5.

FIG. 7 is block diagram of an embodiment of controller 26 depicted in FIG. 5. In FIG. 7, the block diagram includes controller 26, projector(s) 22, camera(s) 24, cockpit alarms and display module 76, and aircraft avionics 78. Controller 26 includes processor(s) 92, input/output interface 94, storage device(s) 96, input devices 98, and output devices 100. Storage device(s) 96 has various storage or memory locations. Storage device(s) 96 includes program memory 102, and data memory 104. Controller 26 is in communication with cockpit alarms and display module 76 and aircraft avionics 78 via input/output interface 94. Aircraft avionics 78 can provide controller 26 with metrics indicative of the aircraft's location, orientation, speed, etc. Controller 26 can provide cockpit alarms and display module 76 with signals indicative of risk of collision with an object(s) external to the aircraft.

As illustrated in FIG. 7, controller 26 includes processor(s) 92, input/output interface 94, storage device(s) 96, input devices 98, and output devices 100. However, in certain examples, controller 26 can include more or fewer components. For instance, in examples where controller 26 is an avionics system, controller 26 may not include input devices 98 and/or output devices 100. Controller 26 may include additional components such as a battery that provides power to components of controller 26 during operation. In some embodiments, controller 26 can be located together with projector(s) 22 and/or camera(s) 24.

Processor(s) 92, in one example, is configured to implement functionality and/or process instructions for execution within controller 26. For instance, processor(s) 92 can be capable of processing instructions stored in storage device(s) 96. Examples of processor(s) 92 can include any one or more of a microprocessor, a controller, a digital signal processor (DSP), an application specific integrated circuit (ASIC), a field-programmable gate array (FPGA), or other equivalent discrete or integrated logic circuitry.

Input/output interface 94, in some examples, includes a communications module. Input/output interface 94, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Storage device(s) 96 can be configured to store information within controller 26 during operation. Storage device(s) 96, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 96 is a temporary memory, meaning that a primary purpose of Storage device(s) 96 is not long-term storage. Storage device(s) 96, in some examples, is described as volatile memory, meaning that storage device(s) 96 do not maintain stored contents when power to controller 26 is turned off. Examples of volatile memories can include random access memories (RAM), dynamic random access memories (DRAM), static random access memories (SRAM), and other forms of volatile memories. In some examples, storage device(s) 96 is used to store program instructions for execution by processor(s) 92. Storage device(s) 96, in one example, is used by software or applications running on controller 26 (e.g., a software program implementing long-range cloud conditions detection) to temporarily store information during program execution.

Storage device(s) 96, in some examples, also include one or more computer-readable storage media. Storage device(s) 96 can be configured to store larger amounts of information than volatile memory. Storage device(s) 96 can further be configured for long-term storage of information. In some examples, Storage device(s) 96 include non-volatile storage elements. Examples of such non-volatile storage elements can include magnetic hard discs, optical discs, flash memories, or forms of electrically programmable memories (EPROM) or electrically erasable and programmable (EEPROM) memories.

Input devices 98, in some examples, are configured to receive input from a user. Examples of input devices 98 can include a mouse, a keyboard, a microphone, a camera device, a presence-sensitive and/or touch-sensitive display, push buttons, arrow keys, or other type of device configured to receive input from a user. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus.

Output devices 100 can be configured to provide output to a user. Examples of output devices 100 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

Discussion of Possible Embodiments

The following are non-exclusive descriptions of possible embodiments of the present invention.

Apparatus and associated methods relate to a system for calculating position values and/or range data of an object(s) external to an aircraft. The system includes a mode selector configured to determine an illumination field of view. The system includes a projector mounted at a projector location on the aircraft and configured to project structured light within the illumination field of view, thereby illuminating the object(s) external to the aircraft that are within the illumination field of view. The system includes a camera mounted at a camera location on the aircraft and configured to receive a portion of the structured light reflected by the object(s) within the illumination field of view. The camera is further configured to focus the received portion of the structured light onto a focal plane array comprising a plurality of light-sensitive pixels, thereby forming an image of object(s) within the illumination field of view. The image includes pixel data generated by the plurality of light-sensitive pixels. The system also includes an image processor configured to identify pixel coordinates corresponding to a subset of the plurality of light-sensitive pixels upon which the received portion of the structured light reflected by the object(s) within the illumination field of view is focused. The image processor is further configured to use triangulation, based on the projector location, the camera location, and the identified pixel coordinates, to calculate the position values and/or range data of the object(s) within the illumination field.

The system of the preceding paragraph can optionally include, additionally and/or alternatively, any one or more of the following features, configurations and/or additional components:

A further embodiment of the foregoing system, wherein the mode selector can be further configured to determine an emission power, and the projector can be further configured to project structured light of the determined emission power.

A further embodiment of any of the foregoing systems, wherein the mode selector can be further configured to determine beam dispersion, and the projector can be further configured to project structured light of the determined beam dispersion.

A further embodiment of any of the foregoing systems, wherein the mode selector can include a selection input device operable by a pilot of the aircraft.

A further embodiment of any of the foregoing systems, wherein the mode selector can determine the illumination field of view within which the structured light is projected, based on ground operation modes of the aircraft.

A further embodiment of any of the foregoing systems, wherein, if the ground operation mode is a high-speed taxi mode, then the mode selector can determine a first illumination field of view within which the structured light is projected. If the ground operation mode is a low-speed taxi mode, then the mode selector can determine a second illumination field of view within which the structured light is projected. The second illumination field of view can have a greater solid-angle than a solid-angle of the first illumination field of view.

A further embodiment of any of the foregoing systems, wherein, if the ground operation mode is a moderate-speed taxi mode, then the mode selector can determine a third illumination field of view within which the structured light is projected. The third illumination field of view can have a greater solid-angle than the solid-angle of the first illumination field of view but less than the solid-angle of the second illumination field of view.

A further embodiment of any of the foregoing systems can further include an aircraft system interface configured to receive signals indicative of aircraft operating parameters.

A further embodiment of any of the foregoing systems, wherein the aircraft operating parameters can include an aircraft taxi speed. The mode selector can be further configured to determine the illumination field of view in response to the received signal indicative of the aircraft taxi speed.

A further embodiment of any of the foregoing systems, wherein the aircraft operating parameters can include an orientation of a steerable wheel. The mode selector can be further configured to determine the illumination field of view in response to the received signal indicative of the orientation of the steerable wheel.

A further embodiment of any of the foregoing systems can further include an audible alarm configured to generate an alert signal. The alert signal can be generated if the calculated position values and range data of the object(s) within the illumination field of view indicate that one or more of the object(s) are within a collision zone or on a collision trajectory.

A further embodiment of any of the foregoing systems, wherein the projector can be an infrared projector configured to project structured light that is infrared light.

Some embodiments relate to a method for generating an alert signal of a potential aircraft collision for a taxiing aircraft. The method includes determining an illumination field of view. The method includes projecting structured light within the determined illumination field of view. The method includes receiving a portion of the structured light reflected by object(s) within the illumination field of view. The method includes focusing the received portion of the structured light onto a focal plane array comprising a plurality of light-sensitive pixels, thereby forming an image of the object(s) within the illumination field of view. The image includes pixel data generated by the plurality of light-sensitive pixels. The method includes identifying pixel coordinates corresponding to a subset of the plurality of light-sensitive pixels upon which the received portion of the structured light reflected by the object(s) within the illumination field of view is focused. The method includes calculating, based on a projector location, a camera location, and the identified pixel coordinates, position values and/or range data of the object(s) within the illumination field of view by which the structured light is reflected. The method also includes generating an alert signal if the calculated position values and range data of the object(s) indicate that one or more of the object(s) are within a collision zone or on a collision trajectory.

The method of the preceding paragraph can optionally include, additionally and/or alternatively, any one or more of the following features, configurations and/or additional components:

A further embodiment of the foregoing method, wherein the illumination field of view external to the aircraft can be determined based on ground operation modes of the aircraft.

A further embodiment of any of the foregoing methods can further include determining an emission power. The projected structured light can be of the determined emission power.

A further embodiment of any of the foregoing methods can further include determining a beam dispersion. The projected structured light can be of the determined beam dispersion.

A further embodiment of any of the foregoing methods can further include receiving signals indicative of aircraft operating parameters. The method can also include determining the illumination field of view in response to a received signal indicative of an aircraft taxi speed.

A further embodiment of any of the foregoing methods can further include receiving signals indicative of aircraft operating parameters. The method can also include determining the illumination field of view in response to a received signal indicative of an orientation of a steerable wheel.

A further embodiment of any of the foregoing methods, wherein determining the illumination field of view within which the structured light is projected can be based on ground operation modes of the aircraft.

A further embodiment of any of the foregoing methods, wherein, if the ground operation mode is a high-speed taxi mode, then the mode selector can determine a first illumination field of view within which the structured light is projected. If the ground operation mode is a low-speed taxi mode, then the mode selector can determine a second illumination field of view within which the structured light is projected. The second illumination field of view can have a greater solid-angle than a solid-angle of the first illumination field of view.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for calculating position values and/or range data of an object(s) external to an aircraft, the system comprising:
   a mode selector configured to determine an illumination field of view;
   a projector mounted at a projector location on the aircraft and configured to project structured light within the illumination field of view, thereby illuminating the object(s) external to the aircraft that are within the illumination field of view;
   a camera mounted at a camera location on the aircraft and configured to receive a portion of the structured light reflected by the object(s) within the illumination field of view, and further configured to focus the received portion of the structured light onto a focal plane array comprising a plurality of light-sensitive pixels, thereby forming an image of object(s) within the illumination field of view, the image comprising pixel data generated by the plurality of light-sensitive pixels; and
   an image processor configured to identify pixel coordinates corresponding to a subset of the plurality of light-sensitive pixels upon which the received portion of the structured light reflected by the object(s) within the illumination field of view is focused, the image processor further configured to use triangulation, based on the projector location, the camera location, and the identified pixel coordinates, to calculate the position values and/or range data of the object(s) within the illumination field.

2. The system of claim 1, wherein the mode selector is further configured to determine an emission power, and the projector is further configured to project structured light of the determined emission power.

3. The system of claim 1, wherein the mode selector is further configured to determine beam dispersion, and the projector is further configured to project structured light of the determined beam dispersion.

4. The system of claim 1, wherein the mode selector comprises a selection input device operable by a pilot of the aircraft.

5. The system of claim 1, wherein the mode selector determines the illumination field of view within which the structured light is projected, based on ground operation modes of the aircraft.

6. The system of claim 5, wherein, if the ground operation mode is a high-speed taxi mode, then the mode selector determines a first illumination field of view within which the structured light is projected, and wherein, if the ground operation mode is a low-speed taxi mode, then the mode selector determines a second illumination field of view within which the structured light is projected, wherein the second illumination field of view has a greater solid-angle than a solid-angle of the first illumination field of view.

7. The system of claim 6, wherein, if the ground operation mode is a moderate-speed taxi mode, then the mode selector determines a third illumination field of view within which the structured light is projected, wherein the third illumination field of view has a greater solid-angle than the solid-angle of the first illumination field of view but less than the solid-angle of the second illumination field of view.

8. The system of claim 1, further comprising:
   an aircraft system interface configured to receive signals indicative of aircraft operating parameters.

9. The system of claim 8, wherein the aircraft operating parameters include an aircraft taxi speed, wherein the mode selector is further configured to determine the illumination field of view in response to the received signal indicative of the aircraft taxi speed.

10. The system of claim 8, wherein the aircraft operating parameters include an orientation of a steerable wheel, wherein the mode selector is further configured to determine the illumination field of view in response to the received signal indicative of the orientation of the steerable wheel.

11. The system of claim 1, further comprising:
    an audible alarm configured to generate an alert signal, wherein the alert signal is generated if the calculated position values and range data of the object(s) within the illumination field of view indicate that one or more of the object(s) are within a collision zone or on a collision trajectory.

12. The system of claim 1, wherein the projector is an infrared projector configured to project structured light that is infrared light.

13. A method for generating an alert signal of a potential aircraft collision for a taxiing aircraft, the method comprising the steps of:
    determining an illumination field of view;
    projecting structured light within the determined illumination field of view;
    receiving a portion of the structured light reflected by object(s) within the illumination field of view;
    focusing the received portion of the structured light onto a focal plane array comprising a plurality of light-sensitive pixels, thereby forming an image of the object(s) within the illumination field of view, the image comprising pixel data generated by the plurality of light-sensitive pixels;
    identifying pixel coordinates corresponding to a subset of the plurality of light-sensitive pixels upon which the received portion of the structured light reflected by the object(s) within the illumination field of view is focused;
    calculating, based on a projector location, a camera location, and the identified pixel coordinates, position values and/or range data of the object(s) within the illumination field of view by which the structured light is reflected; and generating an alert signal if the calculated position values and range data of the object(s) indicate that one or more of the object(s) are within a collision zone or on a collision trajectory.

14. The method of claim 13, wherein the illumination field of view external to the aircraft is determined based on ground operation modes of the aircraft.

15. The method of claim 13, further comprising:
determining an emission power; wherein the projected structured light is of the determined emission power.

16. The method of claim 13, further comprising:
determining a beam dispersion; wherein the projected structured light is of the determined beam dispersion.

17. The method of claim 13, further comprising:
receiving signals indicative of aircraft operating parameters; and
determining the illumination field of view in response to a received signal indicative of an aircraft taxi speed.

18. The method of claim 13, further comprising:
receiving signals indicative of aircraft operating parameters; and
determining the illumination field of view in response to a received signal indicative of an orientation of a steerable wheel.

19. The method of claim 13, wherein determining the illumination field of view within which the structured light is projected is based on ground operation modes of the aircraft.

20. The method of claim 19, wherein, if the ground operation mode is a high-speed taxi mode, then the mode selector determines a first illumination field of view within which the structured light is projected, and wherein, if the ground operation mode is a low-speed taxi mode, then the mode selector determines a second illumination field of view within which the structured light is projected, wherein the second illumination field of view has a greater solid-angle than a solid-angle of the first illumination field of view.

* * * * *